United States Patent [19]

Chang

[11] Patent Number: 5,559,406
[45] Date of Patent: *Sep. 24, 1996

[54] CEILING FAN AND LIGHT ASSEMBLY CONTROL CIRCUIT WITH REMOTE CONTROLLER/SINGLE-THROW SWITCH OPTIONAL CONTROLS

[76] Inventor: Chin-Hsiung Chang, No. 192, Shu Jen Rd., Ban Tan Chun, Wu Fong Hsiang, Taichung Hsien, Taiwan

[*] Notice: The term of this patent shall not extend beyond the expiration date of Pat. No. 5,511,943.

[21] Appl. No.: 341,119

[22] Filed: Nov. 18, 1994

[51] Int. Cl.⁶ .................. H02J 4/00; H04B 10/00
[52] U.S. Cl. .............. 315/322; 340/825.22; 340/825.57; 340/825.72; 307/41; 416/5
[58] Field of Search .............. 340/825.22, 825.69, 340/825.72, 825.57; 416/5; 307/41; 315/322

[56] References Cited

U.S. PATENT DOCUMENTS

| | | | |
|---|---|---|---|
| 4,322,632 | 3/1982 | Hart et al. ................. | 307/41 |
| 4,716,409 | 12/1987 | Hart et al. ................. | 340/825.22 |
| 5,187,472 | 2/1993 | Hart et al. ................. | 340/825.69 |
| 5,189,412 | 2/1993 | Mehta et al. .............. | 340/825.22 |
| 5,488,273 | 1/1996 | Chang ....................... | 318/16 |

Primary Examiner—Robert Pascal
Assistant Examiner—Arnold Kinkead

[57] ABSTRACT

A ceiling fan and light assembly control circuit including a microprocessor controlled by a single-throw switch and an infrared remote controller operated to regulate the fan speed and the intensity of light. A 60 Hz square wave signal of cycle 16.67 ms is obtained from the alternating current power supply and monitored by the microprocessor. When the square wave signal is interrupted by switching the single-throw switch on and off quickly, the micrprocessor triggers a change in the operation mode of the ceiling fan and light assembly. The infrared remote controller can also be operated to control the fan speed and the light intensity when the single-throw switch is switched on.

3 Claims, 3 Drawing Sheets

CEILING FAN AND LIGHT ASSEMBLY CONTROL CIRCUIT WITH REMOTE CONTROLLER/SINGLE-THROW SWITCH OPTIONAL CONTROLS

BACKGROUND AND SUMMARY OF THE INVENTION

The present invention relates to a ceiling fan and light assembly control circuit for controlling the fan speed and the light intensity of a ceiling fan and light assembly by an infrared remote controller or a single-throw switch optionally.

Conventional ceiling fan and light assemblies are generally controlled by a pull chain switch or a single-throw switch. Because pull chain switches and single-throw switches are mechanical switches, the switching mechanism must be fixed in place. Therefore, the user must move to the switch, so that he can operate the switch can be operated to regulate the fan speed or the light.

Various infrared remote controllers are well-known and intensively used for controlling the operation of a variety of ceiling fan and light assemblies. However, a ceiling fan and light assembly of this type becomes unworkable when its infrared remote controller is damaged or the battery power supply of its infrared remote controller is expended.

There is known a ceiling fan and light assembly control circuit which includes an infrared remote controller and a single-throw switch for controlling the operation of a ceiling fan and light assembly. However, the single-throw switch becomes locked and can not be operated when the infrared remote controller is started.

The present invention has been accomplished in view of the above circumstances. It is the major object of the present invention to provide a ceiling fan and light assembly control circuit which controls the fan speed and light intensity by either a single-throw switch and an infrared remote controller. It is another object of the present invention to provide a ceiling fan and light assembly control circuit which includes a single-throw switch and an infrared remote controller for controlling the operation of a ceiling fan and light assembly that do not interfere with each other when either one is operated.

DETAILED DESCRIPTION OF THE PREFERRED EMBODIMENT

Figure 1:
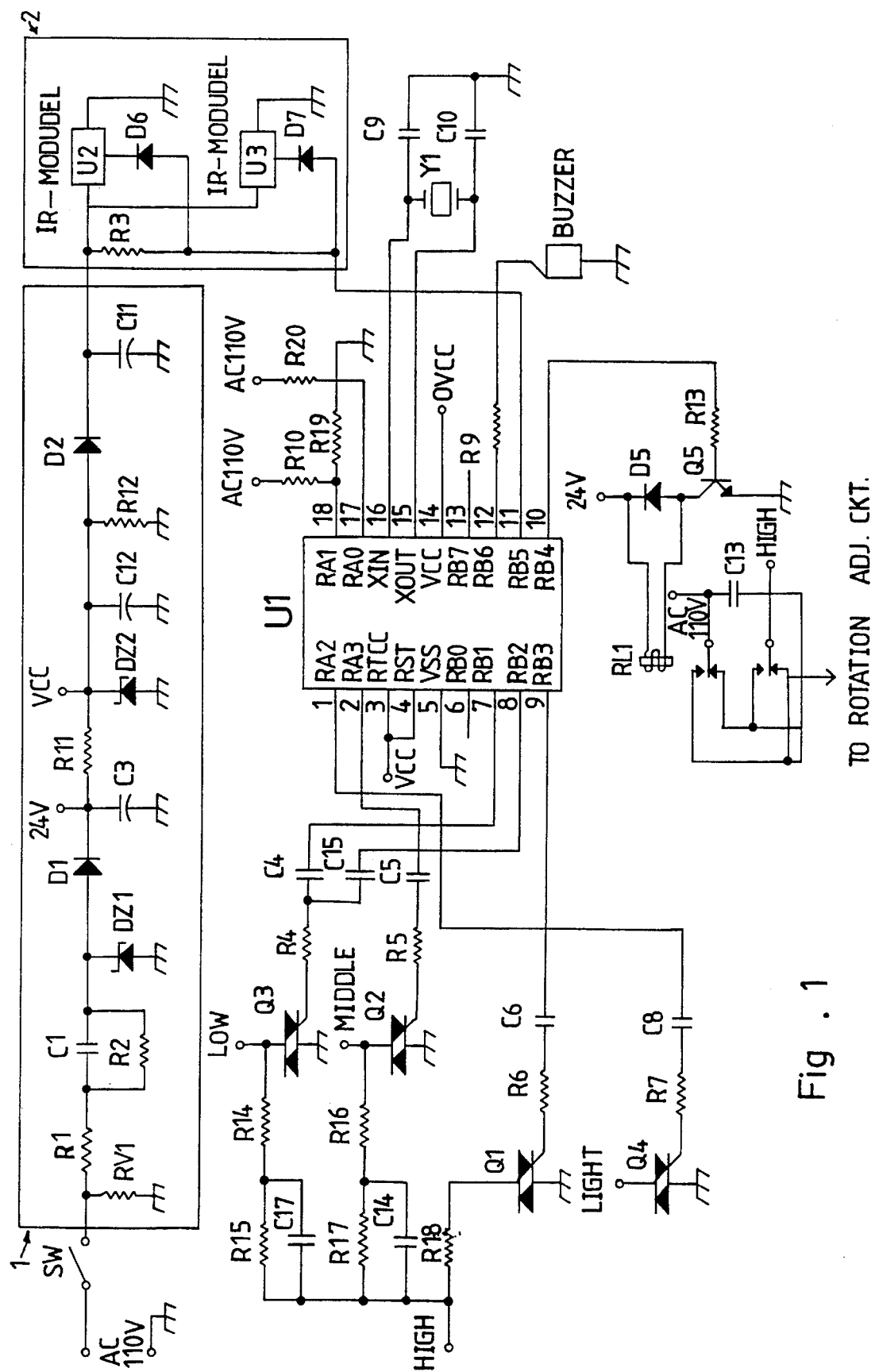
FIG. 1 is a circuit diagram according to the present invention.
Figure 2:
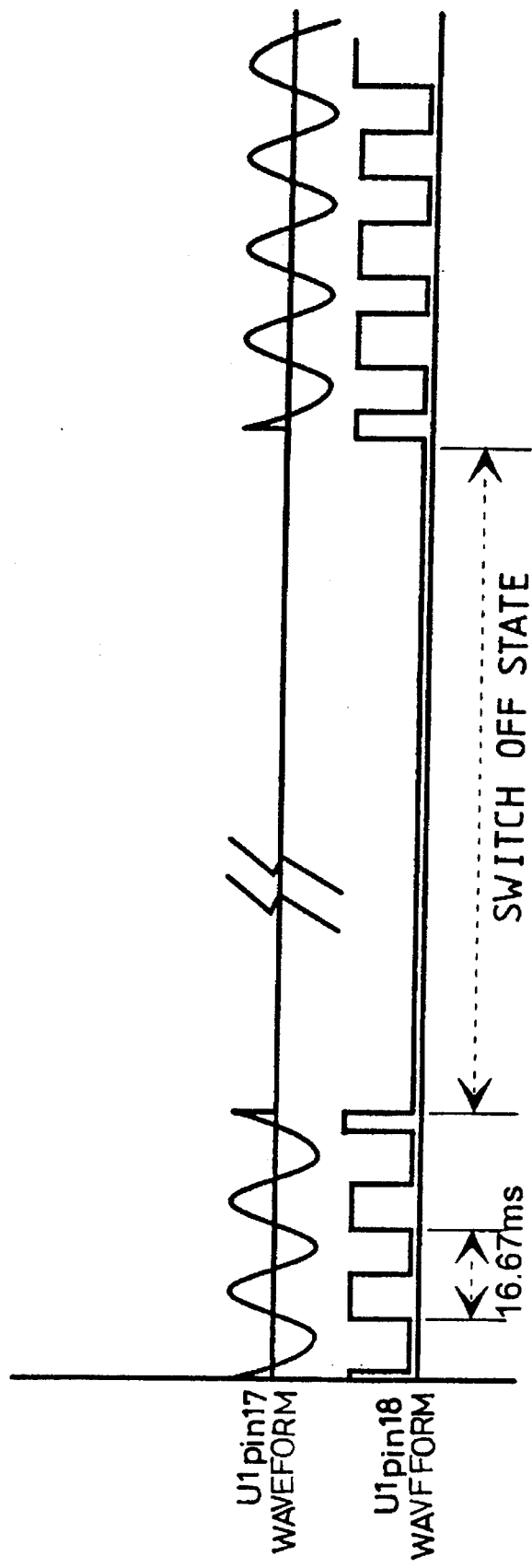
FIG. 2 is a time sequence chart according to the present invention.

FIG. 1 shows a ceiling fan and light assembly control circuit in accordance with the present invention that includes a 8-bit single chip microprocessor PIC16C54 U1 as the control center. Alternating current 110 V city power supply is connected in series to a single-throw switch SW and then to a direct current power supply circuit 1 to provide a direct current 5 V and a direct current 24 V power supply, and then connected to one end of a series of shunt resistors R10 and R19. The middle point of the series of shunt resistors R10 and R19 is connected to RA1 pin 18 of the micrpprocessor U1 to obtain a low voltage square wave of cycle 16.67 ms (equal to alternating current power supply; see FIG. 2). Alternating current power supply which is further connected to a voltage dropping resistor R20 and then to RA0 pin 17 of the microprocessor U1. The gates of the TRIACs Q1, Q2 and Q3, which regulate the fan speed, and the gate of the TRIAC Q4, which regulates the light intensity are respectively connected to the microprocessor U1's RB3 pin 9, RA3 pin 2, RB1 pin 7 and RB2 pin 8, and RA2 pin 1. RB6 pin 12 of the microprocessor U1 is connected to a buzzer. RB4 pin 10 of the microprocessor U1 is connected to the base of a switching transistor, whose collector is connected in series to the coil of a relay RL1. The connecting point between the switching transistor and the relay RL1 is directly connected to the connecting point between alternating current power supply (i.e., not through the single-throw switch SW) and the power supply circuit of the ceiling fan and light assembly. An infrared receiver 2 is connected to RB5 pin 11 of the microprocessor U1. When the single-throw switch SW is switched on, the microprocessor receives a 60 Hz square wave pulse signal (see also FIG. 2), causing the internal program to drive the TRIACs Q1 and Q4, and therefore the fan speed is changed to high speed and the lamps are turned on. When the single-throw switch SW is switched manually, the square wave (alternating current city power supply) is interrupted over 16.67 ms (at this stage, the filter capacitors C11 and C12 of the direct current power supply circuit 1 provide the necessary power supply to the microprocessor U1 for about 5 to 10 seconds), causing the microprocessor U1 is triggered to change to the next mode (i.e., changing the fan speed from high speed to medium speed and keeping the lamps on). When the microprocessor U1 is triggered to regulate the fan speed, it will simultaneously give a signal to the buzzer, causing the buzzer to buzz. The modes of the ceiling fan and light assembly are changed according to the following sequences when the single-throw switch SW is switched cycle by cycle (one cycle includes turning the switch on and off once):

FAN SPEED: HI MI LO OFF HI MI LO OFF HI MI LO . . .

LIGHT: ON ON ON OFF OFF OFF OFF OFF ON ON . . .

Figure 3:
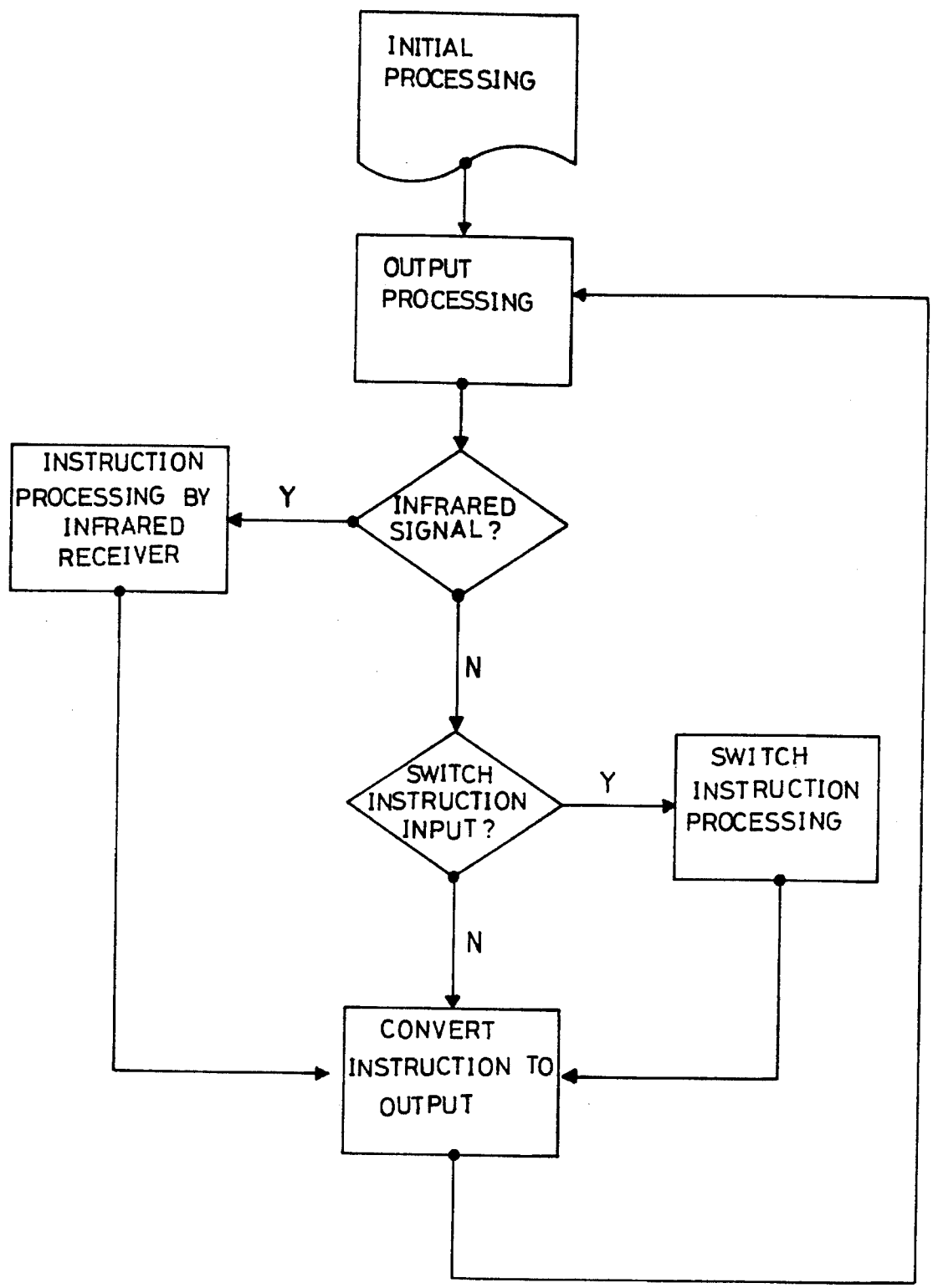
FIG. 3 is an operation flow chart of the internal program of a microprocessor according to the present invention.

When the infrared signal from the infrared emitter is received and detected by the infrared receiver, it is sent to the microprocessor U1 for processing. The infrared remote controller operates only when the single-throw switch SW is on (that is when the power supply is on). It can be operated to control the fan speed and the light intensity. If the infrared remote controller is operated to send an OFF signal to the microprocessor U1, the relay RL1 is triggered to turn the fan motor in the reversed direction. The remote controller can also send an OFF signal to the microprocessor U1, causing it to cut off power supply from TRIACs Q1, Q2, Q3, Q4 and to stop the ceiling fan and light assembly from operation. Under this stage, the ceiling fan and light assembly can be started again by the infrared remote controller or the single-throw switch SW (because the single-throw switch is still maintained at ON state and the microprocessor U1 is maintained at stand-by state when power supply is cut off by the remote controller). Therefore, when the ceiling fan and light assembly is turned off by the infrared remote controller, the user can start the ceiling fan and light assembly again either by the infrared remote controller or the single-throw switch SW. The operational flow of the internal program of the microprocessor U1 is shown in FIG. 3.

I claim:
1. A ceiling fan and light assembly control circuit comprising a direct current power supply circuit, a single-throw switch, shunt resistors, a portable infrared remote controller, an infrared receiver, and a microprocessor; said direct current power supply circuit receiving alternating current power through said single-throw switch, converting said alternating current into low voltage direct current power when said single-throw switch is on and supplying said low voltage direct current power to said microprocessor and said infrared receiver; said direct current supply circuit containing filter capacitors for supplying direct current to said microprocessor for about 5 to 10 seconds when said single-throw switch is turned off after said capacitors are charged; said shunt resistors arranged between said single-throw switch and an input of said microprocessor and creating a square wave signal from said alternating current power and supplying said square wave signal to said microprocessor only when said single-throw switch is on; said microprocessor having an input terminal connected to said infrared receiver, an output terminal connected to a fan speed control circuit and a light intensity control circuit of a ceiling fan and light assembly and an internal program; said internal program monitoring said square wave signal and, when said square wave signal is interrupted by turning said single-throw switch off and on within a period not exceeding 5 to 10 seconds, changing modes of operation of said fan speed control circuit between high, medium, low and off and modes of operation of said light intensity control circuit including on and off; and said infrared remote controller adapted to send fan speed and light intensity regulating signals, independent of said single-throw switch, to said microprocessor through said infrared receiver while said single-throw switch is on, causing said internal program of said microprocessor to change said modes of operation of said fan speed control circuit and said light intensity control circuit.

2. The ceiling fan and light assembly control circuit of claim 1 further comprising a buzzer controlled by said microprocessor to produce a sound when said microprocessor regulates the fan speed.

3. The ceiling fan and light assembly control circuit of claim 1, including a switching transistor, wherein said microprocessor has a terminal connected to a base of said switching transistor, a collector of said switching transistor is connected in series to a coil of a relay, said relay being directly connected in series to a connecting point between said alternating current and a power supply circuit of the ceiling fan and light assembly, and when said infrared remote controller is operated to send an appropriate signal, said microprocessor controls said base of said switching transistor to reverse direction of the fan motor.

\* \* \* \* \*